(12) United States Patent
Sommer et al.

(10) Patent No.: US 8,840,395 B2
(45) Date of Patent: Sep. 23, 2014

(54) HOT RUNNER NOZZLE HAVING AN ELECTRICAL HEATING ELEMENT

(71) Applicants: Siegrid Sommer, Burgwald (DE); Frederic Zimmermann, Frankenberg (DE); Herbert Gunther, Allendorf (DE); Ralf Drossler, Frankenberg (DE)

(72) Inventors: Siegrid Sommer, Burgwald (DE); Frederic Zimmermann, Frankenberg (DE); Herbert Gunther, Allendorf (DE); Ralf Drossler, Frankenberg (DE)

(73) Assignee: GÜNTHER Heisskanaltechnik GmbH, Frankenberg (DE)

( * ) Notice: Subject to any disclaimer, the term of this patent is extended or adjusted under 35 U.S.C. 154(b) by 33 days.

(21) Appl. No.: 13/770,101

(22) Filed: Feb. 19, 2013

(65) Prior Publication Data

US 2013/0216644 A1  Aug. 22, 2013

(30) Foreign Application Priority Data

Feb. 22, 2012  (DE) .......................... 10 2012 101 400

(51) Int. Cl.
*B29C 45/74* (2006.01)
*H05B 3/42* (2006.01)
*B29C 45/27* (2006.01)

(52) U.S. Cl.
CPC ......... *B29C 45/74* (2013.01); *B29C 2045/2751* (2013.01); *B29C 2045/2743* (2013.01); *B29C 2045/274* (2013.01); *B29C 45/2737* (2013.01); *H05B 2203/013* (2013.01); *H05B 3/42* (2013.01); *Y10S 425/013* (2013.01); *Y10S 425/245* (2013.01)
USPC ........... 425/549; 425/DIG. 13; 425/DIG. 245

(58) Field of Classification Search
CPC  B29C 45/74; B29C 45/2737; B29C 45/1734; B29C 2045/2737; B29C 2045/2743; B29C 2045/2751; B29C 2045/2753; B29C 2045/2754
USPC ................ 264/172.15, 328.14, 404, DIG. 46, 264/DIG. 65; 425/549, DIG. 13, DIG. 245, 425/DIG. 246
See application file for complete search history.

(56) References Cited

U.S. PATENT DOCUMENTS

| 4,486,650 A | | 12/1984 | Bridgstock et al. |
| 4,583,285 A | * | 4/1986 | Chatterjee et al. ........... 29/623.5 |
| 5,046,942 A | * | 9/1991 | Gellert .......................... 425/549 |

(Continued)

FOREIGN PATENT DOCUMENTS

| DE | 199 41 038 | 8/1999 |
| DE | 10 2006 049 667 | 10/2006 |

(Continued)

*Primary Examiner* — Yogendra Gupta
*Assistant Examiner* — Emmanuel S Luk
(74) *Attorney, Agent, or Firm* — Clark & Brody

(57) ABSTRACT

A hot runner nozzle having an electrical heating element includes a connector for producing an electrical connection to a connection line, terminal contacts for the heating element terminating in an insulation body for the connector that separates the terminal contacts from one another electrically. The connection line has contact elements that are electrically contactable with the terminal contacts of the heating element. The insulation body is arranged at least in part in a receiving sleeve of the connector, that the connection line may be fixed in or on the receiving sleeve such that the contact elements of the connection line electrically contact the terminal contacts of the heating element, and that a first end of the receiving sleeve that faces towards the heating element wraps around the insulation body and has on this first end two opposing feet that face outward and that are attached to the heating element.

15 Claims, 8 Drawing Sheets

(56) References Cited

U.S. PATENT DOCUMENTS

| | | | | |
|---|---|---|---|---|
| 5,118,280 A * | 6/1992 | Gellert | | 425/549 |
| 5,266,023 A * | 11/1993 | Renwick | | 425/549 |
| 5,312,242 A * | 5/1994 | Gellert | | 425/549 |
| 5,364,252 A * | 11/1994 | Hlavaty et al. | | 425/3 |
| 5,507,636 A * | 4/1996 | Gellert | | 425/549 |
| 6,155,815 A * | 12/2000 | Crandell | | 425/549 |
| 7,034,258 B2 * | 4/2006 | Sutorius | | 219/535 |
| 7,067,774 B2 * | 6/2006 | Hoffmann | | 219/541 |
| 7,131,831 B2 * | 11/2006 | Bazzo et al. | | 425/549 |
| 7,205,511 B2 * | 4/2007 | Enrietti | | 219/535 |
| 7,401,639 B2 * | 7/2008 | Manda | | 164/312 |
| 7,462,031 B2 * | 12/2008 | Feick et al. | | 425/549 |
| 7,513,771 B2 * | 4/2009 | Feick et al. | | 425/549 |
| 7,781,707 B2 * | 8/2010 | Enrietti | | 219/535 |
| 8,692,163 B2 * | 4/2014 | Vogt et al. | | 219/421 |
| 2002/0160075 A1 * | 10/2002 | Bazzo et al. | | 425/549 |
| 2003/0218006 A1 * | 11/2003 | Sutorius | | 219/535 |
| 2004/0022891 A1 * | 2/2004 | Sicilia et al. | | 425/549 |
| 2004/0241277 A1 * | 12/2004 | Schmidt | | 425/549 |
| 2005/0211693 A1 * | 9/2005 | Hoffmann | | 219/237 |
| 2006/0102617 A1 * | 5/2006 | Enrietti | | 219/535 |
| 2006/0275527 A1 * | 12/2006 | Bazzo et al. | | 425/563 |
| 2007/0077821 A1 * | 4/2007 | Pilavdzic | | 439/620.21 |
| 2007/0241207 A1 * | 10/2007 | Enrietti | | 239/135 |
| 2009/0214693 A1 * | 8/2009 | Holliday | | 425/549 |
| 2010/0091814 A1 * | 4/2010 | Kuntz et al. | | 374/147 |
| 2012/0181728 A1 * | 7/2012 | Greb | | 264/328.15 |

FOREIGN PATENT DOCUMENTS

| | | |
|---|---|---|
| DE | 10 2006 049 669 | 10/2006 |
| DE | 10 2008 004 526 | 1/2008 |
| DE | 10 2008 015 376 | 3/2008 |
| WO | 2004/043672 | 5/2004 |
| WO | 2005/053361 | 6/2005 |

* cited by examiner

HOT RUNNER NOZZLE HAVING AN ELECTRICAL HEATING ELEMENT

The invention relates to a hot runner nozzle having an electrical heating element that includes a connector for producing an electrical connection to a connection line.

BACKGROUND OF THE INVENTION

Hot runner nozzles are used in injection molding tools in order to supply a flowable mass, for instance a plastic melt, at a specifiable temperature under high pressure to a separable mold insert. They generally have a material tube with a flow channel that terminates in a nozzle orifice. On its end, the latter forms a nozzle output that opens via a gate aperture into the mold insert (mold cavity).

An electrical heating element is provided on the material tube so that the flowable mass does not cool too soon inside the flow channel. The electrical heating element has a sleeve-like support element and an electrical conductor that produces heat when an electrical voltage is applied or when electrical current flows through it.

As is disclosed for instance in DE 10 2006 049 669 A1, the electrical conductor may be made of a heating coil formed from a resistance wire. In contrast, DE 10 2006 049 667 A1 uses for the electrical conductor so-called thick film heating elements that are applied to the support element as heating conductor strips in the screen printing process. Generally provided between the support element and the electrical conductor is an insulation layer that is also applied as a thick film during the screen printing process. In order to be able to reduce even further the size of the heating element or hot runner nozzle, as in DE 199 41 038 A1, it is also possible to apply the insulation layer and the heating conductor strips directly to the exterior wall of the material tube.

In the following we will proceed as an example from a thick film heater on a cylindrical support element. However, the invention is not limited to this, but rather may be used in the same manner with other heating elements, as well.

In order to supply the thick film heater with energy, provided at each end of the heating conductor strip is a terminal contact, e.g. in the form of a connection lead or a connection pin (see WO 2005/053361 A1, DE 10 2008 004 526 A1, and DE 10 2008 015 376 A1). The heating conductor strip is connected via the terminal contact to the connection line of a current source, it being necessary for such an electrical connection to satisfy all of the following requirements:
  it must be embodied detachable in order to be able to install the hot runner nozzle in the injection molding tool and uninstall it and/or in order to be able to exchange a heating element if there is a defect;
  it must always produce an adequate and reliable electrical contact between the terminal contacts in the heating conductor strips and the connection line that is connected to the current source;
  due to the high temperatures during injection molding, it must be temperature-resistant and withstand mechanical tensile loads that can occur when installing and uninstalling the hot runner nozzle and/or when exchanging the heating element and from vibrations.

U.S. Pat. No. 4,486,650 B1 discloses a detachable plug-in connection between the terminal ends of a heating coil and the connection line for a current supply. The ends of the heating coil are provided with contact pins that are oriented radially outward and that are each arranged approximately in the center of a collar. The ends of the connection line are provided with sleeve-like plug-in contacts that are each disposed in a plug housing. These are inserted into the collars, producing the electrically conductive connection between the outer surface of the contact pins and the inner surface of the plug-in contacts. To prevent the plug housing from separating from the collar, a clamping apparatus in the form of a union nut is screwed onto the male thread of the collar. Therefore a separate plug-in contact is needed for each connection.

WO 2004 043 672 A1 discloses a heating element for placing on a tubular conduit or a hot runner nozzle, the heating element being provided with a conductor through which current flows and that can be connected to a current source via connection lines. The connection lines have an end contact piece that can be placed against a contact surface of the heating element. Furthermore, a clamping apparatus is provided by means of which the contact piece is clamped against the heating element, the contact piece being positioned loose against the contact surface of the heating element and the clamping force of the clamping apparatus acting essentially normally to the contact surface and clamping the contact piece against the contact surface. Loosening the clamping apparatus, which especially includes a sleeve that can be screwed out of the heating element, causes the contact piece to come away from the contact surface so that the heating element can be removed and exchanged. The clamping force produced by the clamping apparatus is created either by a spring or by a tensioning screw.

Such a solution suffers from the drawback that the electrical contact between the contact surfaces of the heating element and the contact pieces of the connection line depends on both the quality and cleanness of the surfaces to be contacted and also on the clamping force of the clamping apparatus. There may be contact problems if the contact surfaces are uneven or soiled or if the clamping force from the spring decreases. This generally leads to lost power inside the heating element. Furthermore, excess heat may develop in the area of the terminal contacts, which may lead to damage to the heating element. Another drawback is the space required, since for each terminal contact a separate sleeve is screwed into the housing of the injection molding nozzle. This make assembling the connection line on and disassembling the connection line from the heating element quite inconvenient, as well.

BRIEF SUMMARY OF THE INVENTION

The object of the invention is to overcome these and other drawbacks of the prior art and to create a hot runner nozzle with an improved electrical connector for an electrical heating element, which electrical connector satisfies at least some of the aforesaid requirements. The connector should furthermore be constructed inexpensively with simple means and should be easy to manage. Simple and rapid assembly are particularly desirable.

In a hot runner nozzle having an electrical heating element that includes a connector for producing an electrical connection to a connection line, terminal contacts for the heating element terminating in an insulation body for the connector that separates the terminal contacts from one another electrically, and the connection line having contact elements that are electrically contactable with the terminal contacts of the heating element, the invention provides that the insulation body is arranged at least in part in a receiving sleeve of the connector, that the connection line may be fixed in or on the receiving sleeve such that the contact elements of the connection line electrically contact the terminal contacts of the heating element, and that a first end of the receiving sleeve that faces towards the heating element wraps around the insulation body and has on this first end two opposing feet that face outward and that are attached to the heating element.

The receiving sleeve, together with the insulation body, forms a connection point, especially a type of plug or coupling for receiving the connection line and its contact elements. The connection line may be detachably fixed via the receiving sleeve on the heating element so that the hot runner nozzle can be installed in and uninstalled from the injection molding tool rapidly and easily. The connection line is typically connected to a current source. The contact elements disposed at the other end of the connection line are always safely and detachably electrically contactable with the terminal contacts of the heating element. For this purpose, the end of the connection line may include a plug or a coupling that may be detachably fixed to the receiving sleeve. This makes the injection molding nozzle easy to manage after being separated from the connection cable, since there is no long cable attached to it that has to be untangled or moved. This is also extremely beneficial with respect to maintenance and assembly costs. In addition, it is useful when the connection line can be fixed to or on the receiving sleeve in a positive and/or non-positive fit, especially if the connection line can be locked to the receiving sleeve. To this end the receiving sleeve and the connection line should have appropriate locking elements that engage when coupled when the plug is inserted.

Moreover, the inventive connector also withstands higher temperatures with no problem since the detachable interface between the heating element and the connection line is arranged spaced apart from the extremely heated area of the heating element.

In addition, the connector offers mechanical strain relief for the terminal contacts of the heating element, which is important when installing and uninstalling the hot runner nozzle and/or when changing the heating element. The inventive feet in particular contribute to this, so that the connector withstands great forces. The feet may also be arranged in a space-saving manner.

Furthermore, the insulation body and the receiving sleeve may be produced from different materials depending on requirements so that the specific requirements are optimally satisfied.

Two terminal contacts for the heating element may be arranged in the insulation body, and each of them may be provided with a contact pin. These continue the generally sensitive terminal contacts for the heating element, which terminal contacts are soldered to the ends of the heat conductor strips, and in conjunction with the insulation body offer much improved mechanical stability. They are preferably disposed perpendicular to the surface of the heating element.

In addition, another contact pin that is electrically connected to the ground of the heating element may be provided in the insulation body. Such another contact pin is preferably embodied longer than the other contact pins. The advantage is that when the connection line is plugged in and removed at any time there is a ground connection, even when one of the other contact pins is contacted. This effectively prevents short circuits and uncontrolled discharges. Alternatively, the ground connection may be made via the receiving sleeve if it is embodied electrically conductive. In accordance with one inventive addition, one or two additional terminal contacts in the insulation body are provided with contact pins that are electrically connected to a thermosensor for the heating element. Such a thermosensor may be embodied as a sheath thermoelement or as a thick film thermoelement.

The contact pins and the additional contact pin are attached in the insulation body in a positive and/or non-positive fit, which has an extremely beneficial effect on the stability of the connector. The contact pins either may project beyond a neck section of the insulation body or they are at least somewhat recessed in the insulation body.

In one refinement of the invention it is provided that the heating element has a support tube. Thus the heating element has an essentially fixed structure and temperature distribution is easy to predict. The heating element may also be precisely positioned in the hot runner nozzle by means of the support tube. Such a support tube may inter alia be pushed onto a material tube of the hot runner nozzle, or the material may even form the support tube. Due to higher line pressures in the interior of the material tube, a support tube with a round cross-section is preferred, and the material tube is especially embodied round.

In another embodiment of the invention, the two feet of the receiving sleeve face opposing directions in the longitudinal direction of the support tube. This makes it possible to embody the hot runner nozzle relatively slender so that a plurality of hot runner nozzles may be arranged densely next to one another, as for example on a manifold.

One variant of the invention provides that the heating element has a covering protective element through which the terminal contacts are passed and the feet of the receiving sleeve are attached to the protective element. Such a protective element protects the heating element from outside mechanical effects. It may be embodied for instance as a protective tube.

Further protection against mechanical damages may be obtained using a buffer layer made of temperature-resistant material that is arranged between the insulation body and the heating element. A buffer layer made of mica is suitable for this, for instance. The buffer layer should have a lower hardness than the insulation body and the heating element, which generally include brittle materials like ceramics. The latter may also be mutually damaging. The buffer layer usefully has recesses that correspond to the terminal contacts or to the contact pins.

A particularly compact configuration and easily dosable heat output is obtained in one embodiment of the heating element in which the heating element has an electrically conductive thick film. Preferably the thick layer has recesses in the area of the feet of the receiving sleeve. Thus the feet may be attached to the support substrate of the thick film. This is especially suitable for obtaining an extremely reliable connection between the feet and the heating element. A resistor strip applied using thick film technology is particularly suitable for heating with a thick film. This resistor strip may be applied directly to a support element or may even be applied to substrate thick film. A thick film cover layer applied to the top may be provided for protection and for electrical insulation.

A further refinement of the invention provides that the receiving sleeve is made of metal. Metal is relatively temperature, aging, and wear resistant, is well suited for absorbing tensile stresses, is deformable, and is suitable for a variety of fastening methods, such as welding, ultrasonic welding, gluing, soldering, bolting, etc. The inside of the sleeve may embody a receiving structure for the insulation body and/or the plug/coupling for the connection line. Alternatively such an interior structure may also be produced in that the receiving sleeve has a concentric interior inner sleeve. Such an inner sleeve would then be fixed in an outer sleeve of the receiving sleeve. If the inner sleeve has a collar, the latter may be supported concentrically on the outer sleeve of the receiving sleeve and production is especially simple, especially the joining of inner and outer sleeves. Thus the collar of the inner sleeve may be joined to the outer sleeve in a material bond, for instance by welding.

In accordance with one further refinement of the invention, the receiving sleeve embodies a guide means for a plug or a coupling of the connection line. This simplifies attaching the connection line to the receiving sleeve. Thus, e.g., it is not possible for the wrong poles in the electrical lines to be contacted with one another. In addition, it is nearly impossible to bend the terminal contacts or contact pins out of shape. Depending on whether the connection line has a plug or coupling, the receiving sleeve should be embodied as a coupling housing or preferably as a plug housing. The latter is preferred, since plugs are designed slimmer and thus less space is needed for the connector in the immediate vicinity of the heating element.

One particularly advantageous refinement of the invention provides that the feet are attached to the heating element in a material bond. Mechanical or separate fastening means are thus not necessary, which has a beneficial effect on production costs. Material bonds like welding bonds are also very strong, do not release due to thermal change, and may be produced by automation. In addition, there is no intervention in the structure of the heating element, which is particularly important if the heating element includes a support tube embodied as a material tube. Feet welded to the heating element are most suitable. Laser welding methods, electric welding methods, and ultrasonic welding methods are suitable for this.

In one embodiment of the receiving sleeve, the feet are embodied integral with the receiving sleeve. The connection between the feet and the receiving sleeve is as strong as the material. At the same time, production is especially simple. The receiving sleeve and the feet may be produced from one tube. Such a tube may first be lengthened, then the feet may be provided using longitudinal cuts, and finally the feet may be bent outward.

In one inventive variant, the feet are each fixed with a leg section on the receiving sleeve and are each attached to a support section that is positioned against the heating element. The leg section disposed between the feet and the receiving sleeve may run at an angle to the longitudinal direction of the support tube. In such V-shaped spread leg sections, the connection between the feet and the receiving sleeve is spaced apart from the heating element. The receiving sleeve is stably joined to the heating element by such an anchoring. In order to be able to produce a very strong connection between the feet and the heating element, it is possible to embody each of the support surfaces of the support section of the feet as a negative of a corresponding support surface of the housing element, e.g. to embody it concave if the heating element is round. The also simplifies the fastening process.

In order to stably fix the insulation body, as well, one refinement of the invention provides that the feet are attached under a prestressing force on the heating element and acting in the direction of the heating element, the receiving sleeve being coupled to the insulation body such that the insulation body is force-actuated with this prestressing force in the direction of the heating element. This prestressing force may be produced by the feet themselves or by a spring element. The spring element may be arranged between the insulation body and the receiving sleeve. When fixing the feet to the heating element, the spring element should then be acted upon with a force, especially e.g. by pressing the receiving sleeve down in the direction of the heating element. The spring element may be embodied integral with the receiving sleeve. However, it is also possible to use a separate spring element, for instance a disc spring or a leaf spring. The receiving sleeve or the spring element are supported in the axial direction of the receiving sleeve preferably on a base of the insulation body so that the latter in the mounted position is pressed against the heating element with a permanent and defined force.

For transmitting the prestressing force from the receiving sleeve to the insulation body, these may be coupled to one another via an undercut. Alternatively, they may also be coupled to one another by means of an additional coupling means, or they may be joined to one another directly using an adhesive bond, e.g. by gluing, welding, laser welding, ultrasonic welding, or soldering.

In one extremely advantageous embodiment of the insulation body, it has a neck section and a base section, the receiving sleeve being supported on the base section of the insulation body. The neck section may thus be embodied relatively slender, while the base section has a wide, stable support surface on the heating element. It also contributes substantially to the stability of the connector, which withstands mechanical and thermal loads with no problem. In addition, terminal contacts disposed below the base section may be covered and electrically separated from one another by spacing. In addition, the base embodies a suitable undercut which provides plenty of support for the receiving sleeve. If the heating element includes a round support tube, it is enough to extend the base essentially longitudinally. The bottom side of the base section may have a support surface with the negative of the opposing support surface of the heating element.

Furthermore, one embodiment of the invention provides that the receiving sleeve has a section with an inner wall, the geometry of which essentially corresponds to the corresponding outer geometry of the neck section of the insulation body. Thus receiving sleeve and insulation body may be positioned relative to one another in a defined manner. In the most simple case the inner wall of the receiving sleeve is a cylinder jacket. The neck section of the insulation body should correspondingly be cylindrical. It is also possible to embody an antirotation lock between the insulation body and the receiving sleeve, for instance by means of groove and spring. The two components are thus always reliably positioned relative to one another during assembly and operation.

Furthermore one refinement of the invention relates to a housing that surrounds the heating element, in which housing a lateral recess is added that is embodied open in the longitudinal direction of the hot runner nozzle to a manifold or to a flange of a material tube, the receiving sleeve projecting through the lateral recess. This enables simple assembly of the hot runner nozzle in that the housing may be pushed longitudinally onto the heating element. During disassembly the housing may be rapidly and easily removed from the heating element without destroying it.

Another optional feature may be embodied in that the receiving sleeve has a fastening means for the thermosensor. The thermosensor is led out on the same nozzle side and is supported by means of the receiving sleeve. This fastening means is preferably positioned spaced apart from the heating element and its receiving channel faces away from the heating element. The thermosensor thus runs parallel to the connector of the heating element. In the direction of the heating element the thermosensor may initially be conducted about the heating element in a coil before it runs parallel to the support tube in the direction of the nozzle orifice of the hot runner nozzle. A pass-through sleeve arranged on the outside of the receiving sleeve is suitable as a fastening means that fixes well. In order to be able to exchange the thermosensor particularly rapidly, an alternative embodiment of the fastening means with a spring clip arranged on the outside of the receiving sleeve may be preferred.

BRIEF DESCRIPTION OF THE DRAWINGS

Additional features, details, and advantages of the invention result from the wording of the claims and from the following description of exemplary embodiments using the drawings.

DETAILED DESCRIPTION OF THE INVENTION

Figure 1:
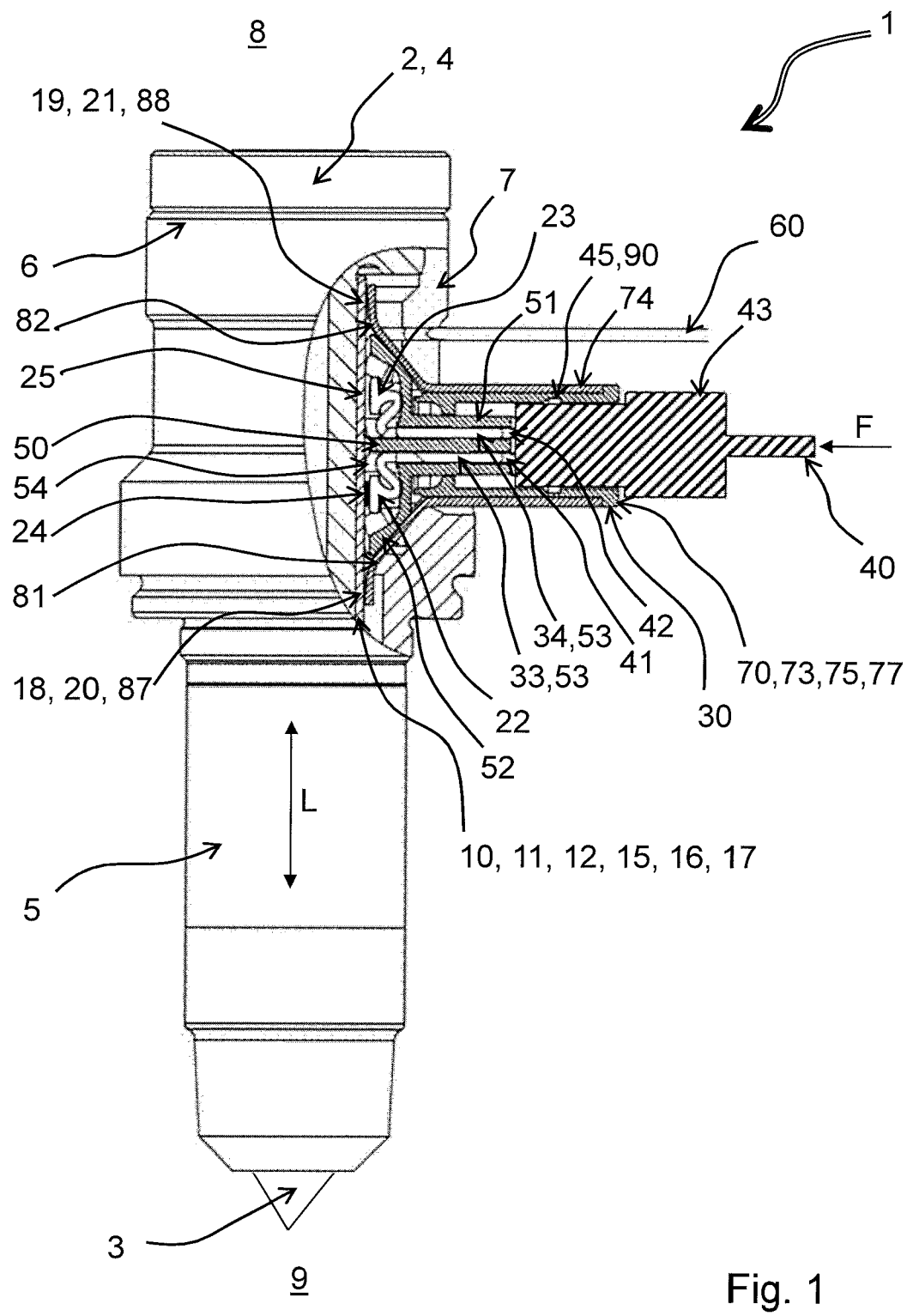
FIG. 1 is a 3D elevation of a hot runner nozzle having a heating element with a connector shown in a cut-away cross-section.
Figure 2:
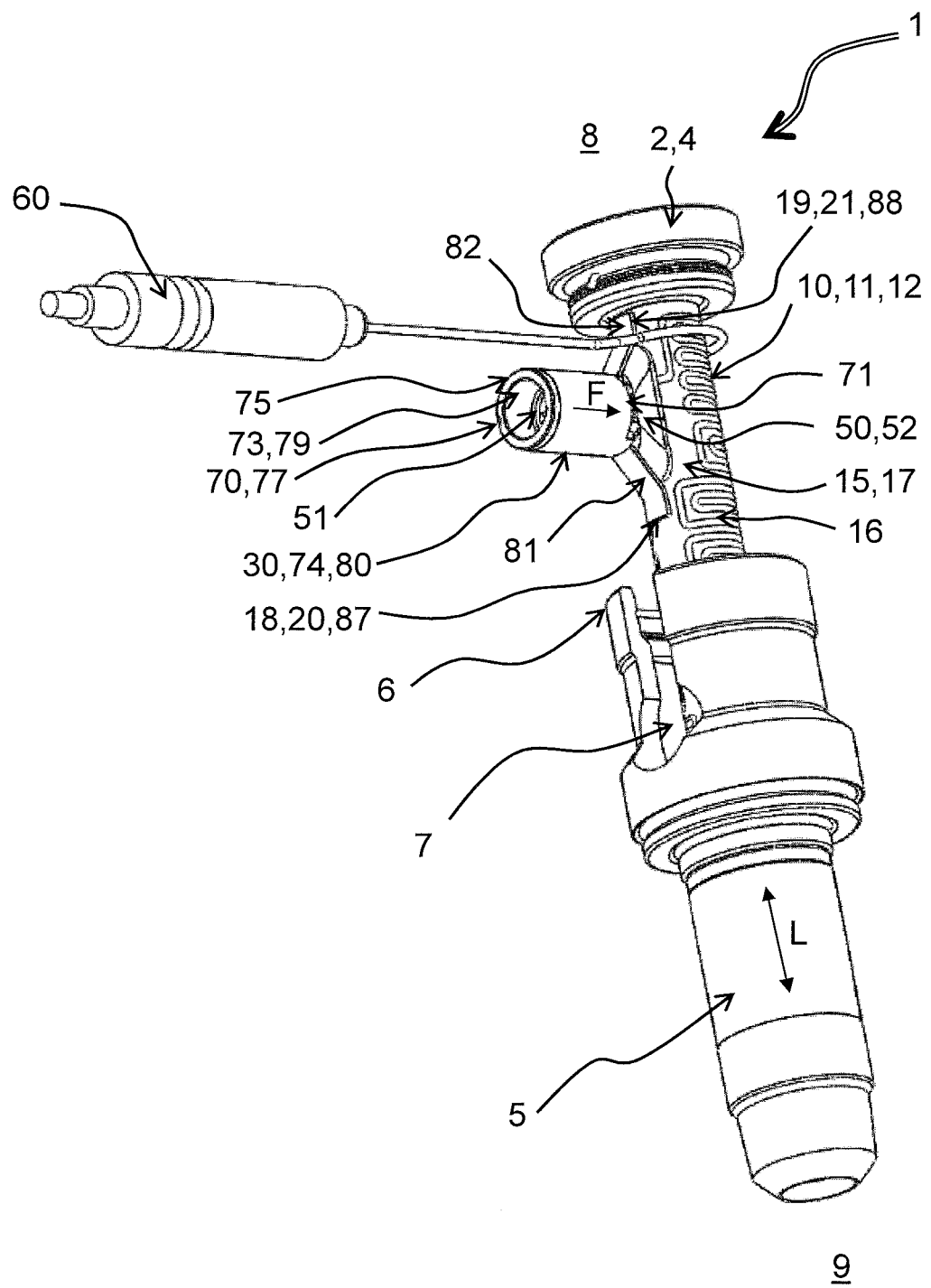
FIG. 2 is a hot runner nozzle having a heating element with a connector and a housing in a pre-assembly position.

FIG. 1 is a 3D elevation of a hot runner nozzle 1 having a heating element 10 with a connector 30 shown in cut-away cross-section. FIG. 2 is a hot runner nozzle 1 that is essentially the same as the one in FIG. 1, shown in a 3D elevation and having a heating element 10 with a connector 30, a housing 5 being depicted in a forward pre-assembly position relative to the rest of the hot runner nozzle 1.

A hot runner nozzle 1 such as the one illustrated in FIGS. 1 and 2 is used in an injection molding tool (not shown) in order to supply a flowable plastic melt to a separable mold insert 9 (not shown in greater detail). A plurality of hot runner nozzles 1 of the same or different design may be fixed on a manifold 8 (also not shown).

The hot runner nozzle 1 has a material tube 2 with a hot-melt channel (not shown) that opens into a nozzle orifice 3, especially a nozzle tip. At its end the latter forms a nozzle output aperture (not identified in greater detail) that opens via a gate aperture (also not shown) into the mold insert 9 of the injection molding tool. At its opposing end the material tube 2 bears a flange 4 that is sealingly attached to the manifold 8 or a machine nozzle for the injection molding tool.

An electrical heating element 10 (shown only schematically) is seated on the exterior circumference of the material tube 2. The electrical heating element 10 includes a support tube 12 and a thick film heater 15, 16, 17 attached thereto. In particular the support tube 12 has a round cross-section. Furthermore, the support tube 12 is pushed onto the material tube 2 of the hot runner nozzle 1. The thick film heater includes a substrate first thick film 15, a conductive second thick film 16, and a covering third thick film 17. The substrate first thick film 15 is a ceramic insulation layer applied directly to the support tube 12. The conductive second thick film 16 embodies the actual heating film, this having a serpentine and/or branched heating conductor strip that is provided at its ends with connection surfaces 24, 25. The covering third thick film 17 protects and insulates the heating conductor strips. The heating conductor strips, which may be configured in any manner desired, may be applied, depending on the performance required, in different densities and arrangements to the substrate first thick film 15. This makes it possible to attain a defined temperature distribution inside the material tube 2 as needed. The structure of such a heating element is described in DE 10 2006 049 667 A1, referred to herein. DE 10 2006 049 669 A1 discloses an alternative heating element, and its contents are also referred to herein.

Attached to the connection surfaces 24, 25 of the heating conductor strip are terminal contacts 22, 23, for instance in the form of connection wires or lines, that are attached to the heating conductor strips by means of electrically conductive adhesive films. DE 10 2008 015 376 A1 describes the structure of one such electrical connection having a plurality of electrically conductive adhesive films and its contents are referenced herein. The terminal contacts 22, 23 may also be attached to the terminal surfaces 21 using other methods, however, for instance by welding or by mechanical means.

The material tube 2 is seated together with the heating element 10 in a housing 5 that is inserted into a recess in the injection molding tool and centers the hot runner nozzle 1 relative to the gate aperture. As may be seen in FIG. 2, added to the housing 5 is a lateral recess 7 that is open in the longitudinal direction L of the hot runner nozzle 1 to the manifold 8 or to the flange 4 of the material tube 2. The recess 7 facilitates receiving and inserting a connector 30 for the heating element 10, which connector 30 is arranged in particular via the connection surfaces 24, 25 of the heating element 10 and projects radially outward. It may be seen that when the hot runner nozzle 1 is mounted the flange 4 of the material tube 2 is positioned against the end 6 of the housing 5 so that the flange 4 closes the recess 7.

The connector 30 produces an electrical connection between the electrical heating element 10 and a connection line 40, the terminal contacts 22, 23 of the heating element 10 being in contact with the contact elements 41, 42 of the connection line 40. The latter is connected to a current source (not shown) that supplies the heating element 10 with current when the hot runner nozzle 1 is operating.

Figure 5:
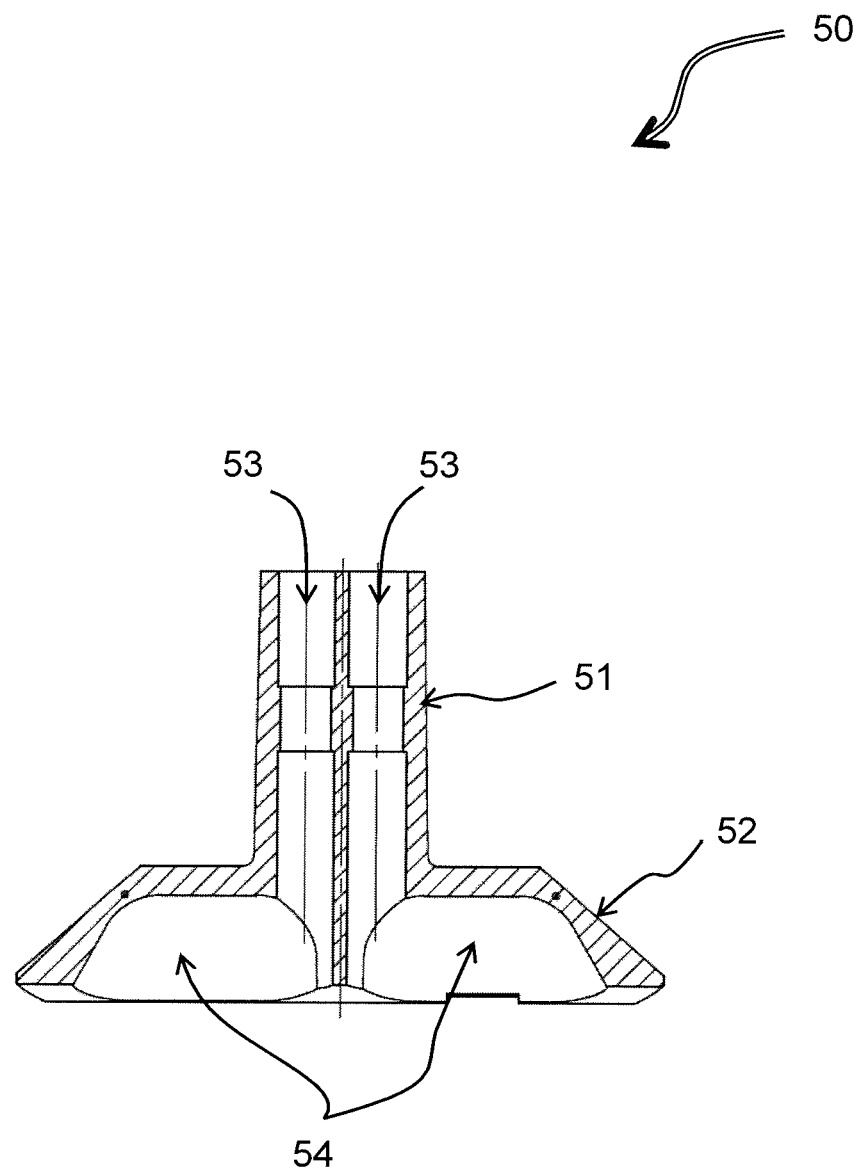
FIG. 5 is a section through an insulation body.

The connector 30 has an essentially bell or hat shaped insulation body 50 that is preferably made of a ceramic material or of another insulating material. This insulation body 50, which may be seen in FIGS. 1 and 2, is depicted in detail in FIGS. 5 through 7. It has a neck section 51 and a base section 52 and receives the terminal contacts 22, 23 of the heating element 10, electrically separating these from one another.

As FIG. 1 in particular depicts, the ends of the terminal contacts 22, 23 of the heating element 100 are provided with contact pins 33, 34. These are preferably fashioned from silver or another noble metal and securely joined to the terminal contacts 22, 23 of the heating element 10 by soldering or crimping.

Each contact pin 33, 34 is inserted from below in a positive and/or non-positive fit into the insulation body 50 which to this end is provided with two parallel receiving channels 53. Both receiving channels 53 terminate in separate cavities 54 that are embodied in the area of the base section 52 (see also FIGS. 5 and 7). It may be seen in FIG. 1 that the cavities 54 are dimensioned such that they may receive the terminal contacts 22, 23 and such that the base section 52 covers both the terminal contacts 22, 23 and the connection surfaces 24, 25 of the heating conductor strips. The relatively sensitive areas of the electrical terminals are protected from the outside in this manner.

The contact pins 33, 34 may be embodied and inserted into the insulation body 50 such that, as is depicted in FIGS. 1 and 2, their free ends do not project over the end face of the neck section 51 of the insulation body 50. In an alternative embodiment, however, they may certainly project beyond the end face of the neck section 51.

Figure 6:
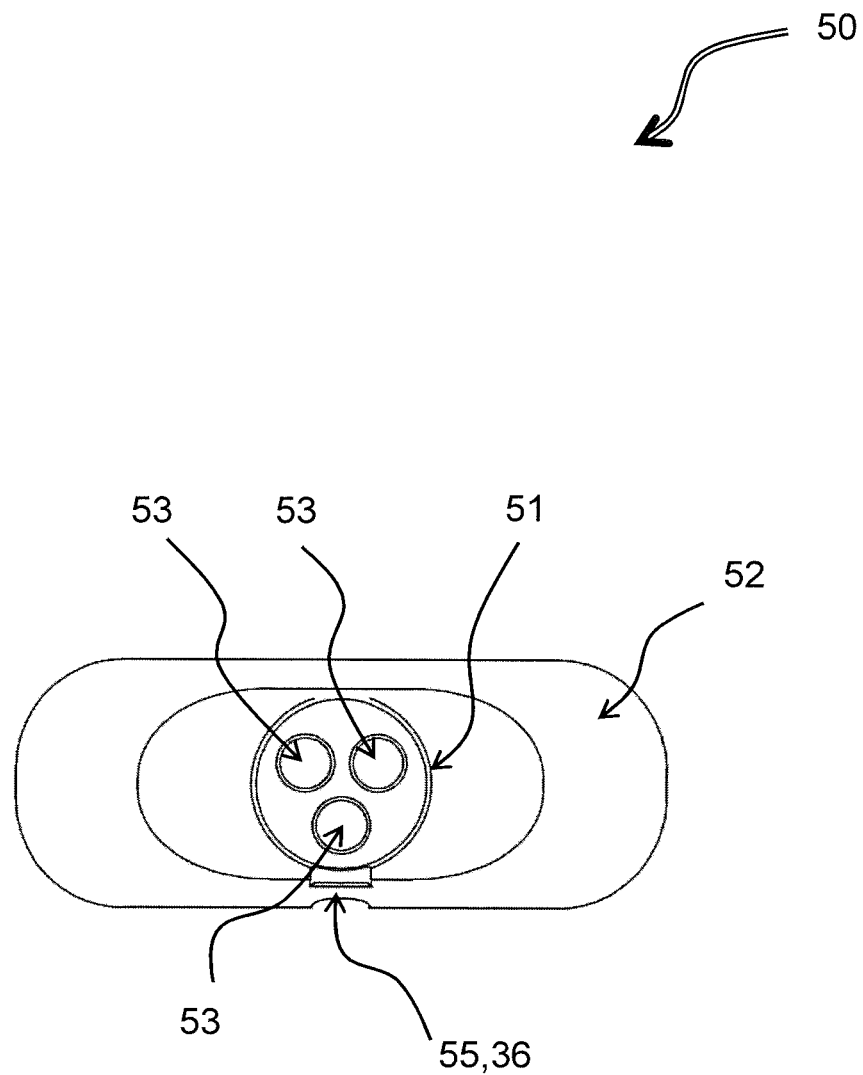
FIG. 6 is bird's eye view of an insulation body.
Figure 7:
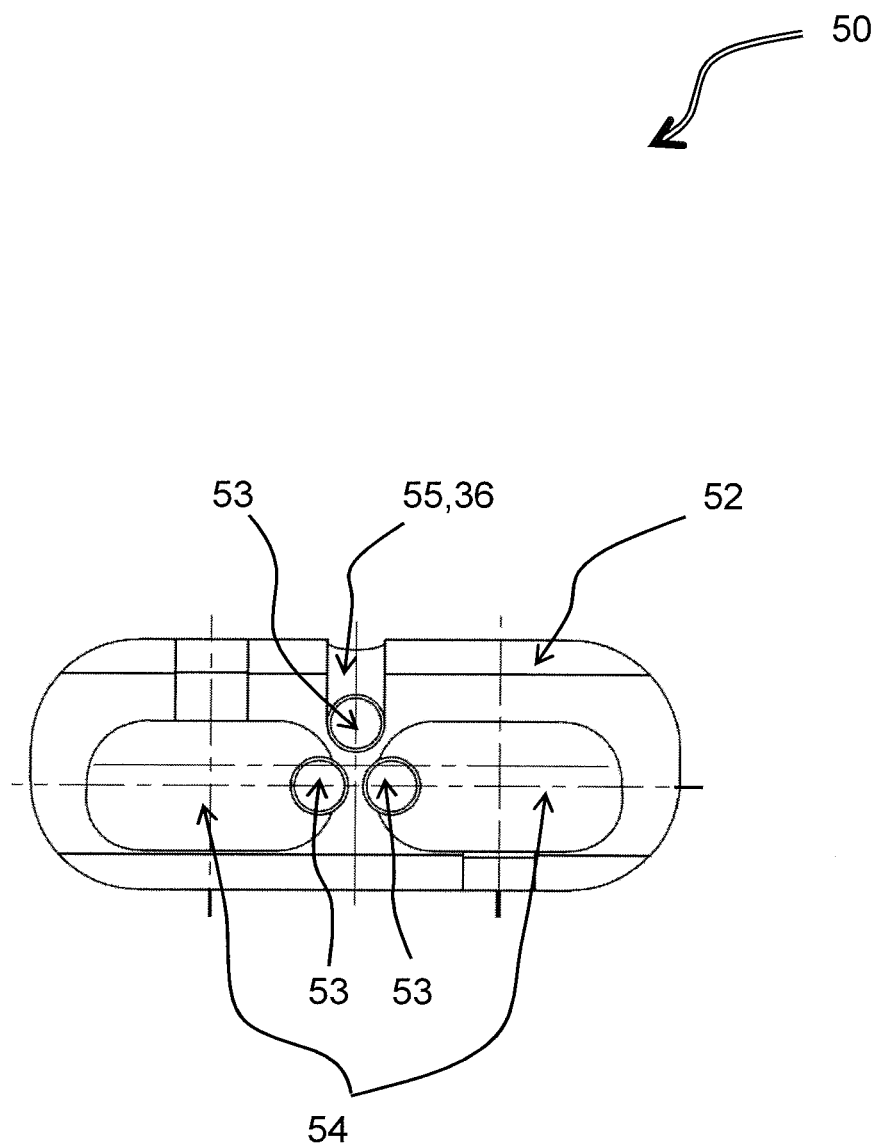
FIG. 7 is an elevation of an insulation body from the direction of the heating element.

As FIGS. 6 and 7 suggest, another contact pin for a ground connection 36 is provided in the insulation body 50. For this, embodied inside the insulation body 50 is another receiving channel 53 (see also especially FIGS. 6 and 7) that receives the other contact pin in a positive and/or non-positive fit. The additional receiving channel 53 terminates in a lateral recess 55. This is for the ground connection 36 to pass through. The additional contact pin of the ground contact 36 is also fashioned from silver or another noble metal and joined to the heating element 10 by soldering or crimping to the connection wire of the ground connection 36. The contact pin for the ground connection 36 is embodied longer than the contact pins 33, 34 for the heating conductor strips so that the ground contact is always produced first when the electrical heating element 10 is connected to the connection line 40 or to the current supply.

Figure 3A:
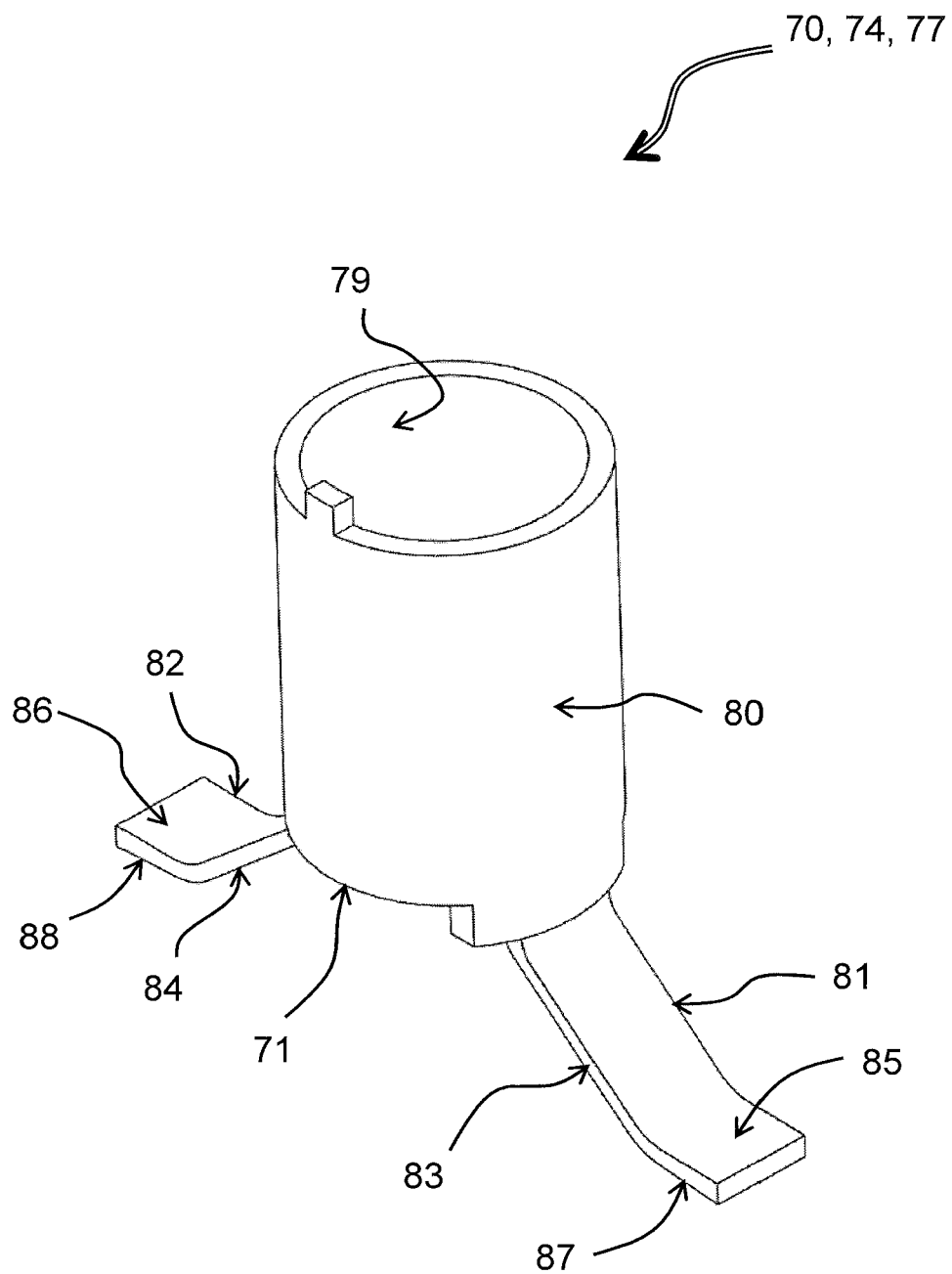
FIG. 3a is a 3D elevation of a receiving sleeve embodied as a coupling housing.

At least sections of the insulation body 50 are arranged in a receiving sleeve 70 (in this regard see the detailed depictions in FIGS. 3a, 3b, and 4) of the connector 30 (see FIGS. 1 and 2). As FIGS. 1 and 2 depict, when mounted, the neck section 51 of the insulation body 50 is seated in the receiving sleeve 70. The receiving sleeve 70 has a section with an inner wall 79, the geometry of which largely corresponds to the corresponding outer geometry of the neck section 51 of the insulation body 50.

The inner wall 79 of the section is a cylinder jacket. Additionally, an anti-rotation lock is embodied between the insulation body 50 and the receiving sleeve 70, especially by means of a spring-groove geometry. Furthermore, the base section 52 is disposed in the area of the heating element 10.

A first end 71 of the receiving sleeve 70 facing towards the heating element 10 wraps around the insulation body 50. At this first end 71 the receiving sleeve 70 also has two opposing feet 81, 82 that face outward and that are attached to the heating element 10. The two feet 81, 82 are opposite one another in the longitudinal direction L of the support tube 12. In addition, the feet 81, 82 each have a leg section 83, 84, and these are situated essentially in a V shape relative to one another. For attaching the feet 81, 82 to the heating element 10, the thick film 15, 16, 17 has recesses 18, 19 in the area of the feet 81, 82. This permits stable attachment of the feet 81, 82 to the support tube 12 of the heating element 10. The receiving sleeve 70 and the support tube 12 are especially made of metal. Attachment is therefore preferably in a material bond, especially using (laser) welding.

The feet 81, 82 depicted in FIGS. 1 through 4 are each fixed to the receiving sleeve 70 with a leg section 83, 84 and are each attached thereto with a support section 85, 86 positioned against the heating element 10. The support surfaces 87, 88 of the support sections 85, 86 of the feet 81, 82 may have a shape that is the negative of a corresponding support surface 20, 21 for the heating element 10. When assembled as in FIGS. 1 and 2, the feet 81, 82 are attached to the heating element 10 under a prestressing force F that acts in the direction of the heating element 10. For this, the receiving sleeve 70 is coupled to the insulation body 50 such that the insulation body 50 is force actuated towards the heating element 10 with this prestress force F. The coupling is accomplished using an undercut between the receiving sleeve 70 and the insulation body 50. In particular the receiving sleeve 70 is supported on the base section 52 of the insulation body 50. Alternatively, coupling may be accomplished using a spring element. The latter may be embodied integral with the receiving sleeve 70.

Figure 3B:
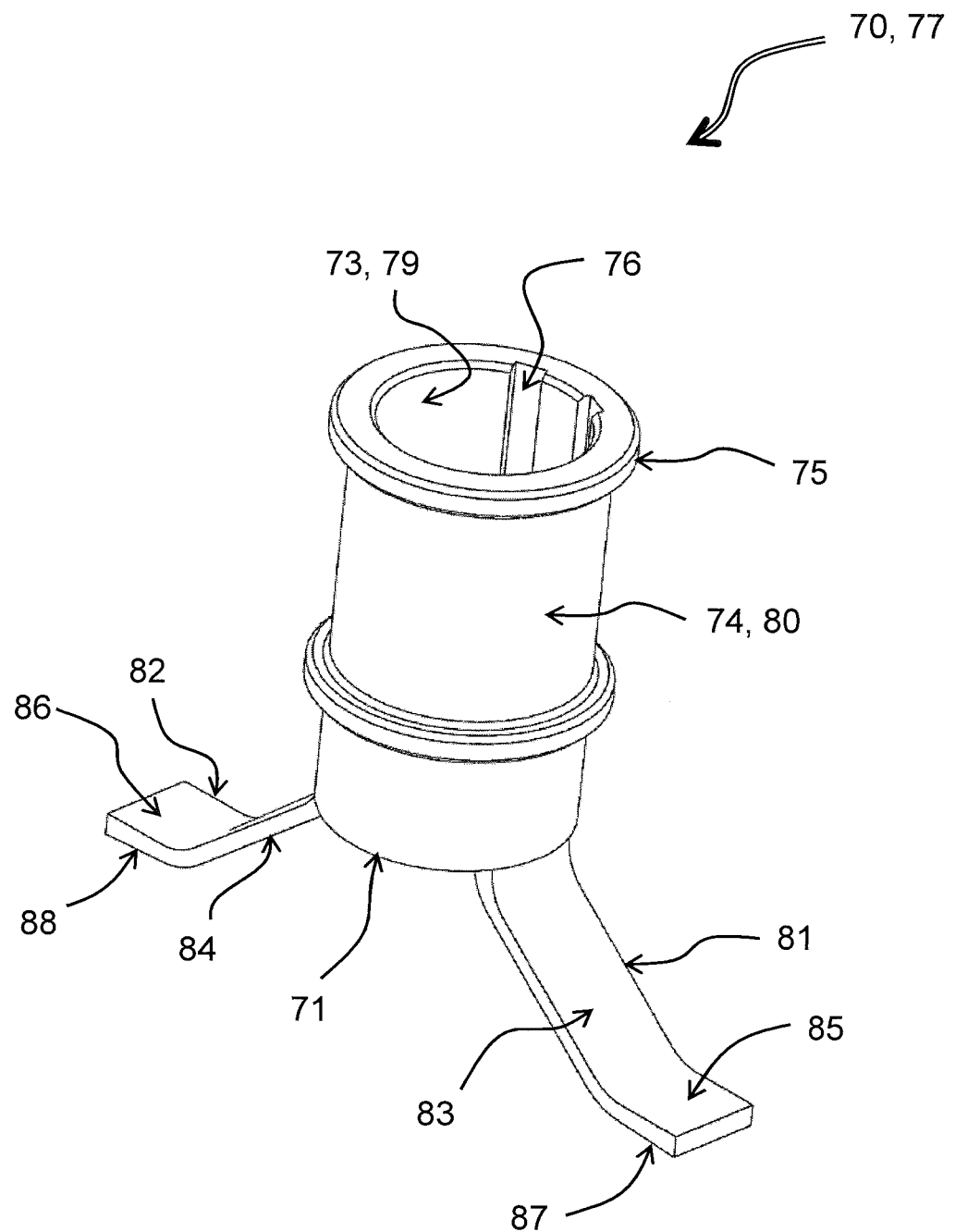
FIG. 3b is a 3D elevation of another receiving sleeve embodied as a coupling housing.

Furthermore, the receiving sleeve 70 depicted in FIGS. 1, 2, and 3b has a concentric interiorly disposed inner sleeve 73 that is fixed in an outer sleeve 74 of the receiving sleeve 70. The inner sleeve 73 has a collar 75 that is supported concentrically on the outer sleeve 74 of the receiving sleeve 70. In accordance with FIGS. 1 and 2, the collar 75 of the inner sleeve 73 is joined in a material bond to the outer sleeve 74, especially by welding. This makes it possible to fabricate the inner sleeve 73 and the outer sleeve 73 by means of different production methods. The inner sleeve 73 may preferably be produced using laser sintering. In contrast, the outer sleeve 74 and the feet 81, 82, which are ideally embodied integral therewith, may be produced from a semi-finished tube using separating and machining methods. In particular the outer sleeve should especially have high tensile strength, be less brittle, and be formable. The receiving sleeves 70 depicted in FIGS. 1 through 3b are in particular embodied as coupling housings 77. As may be seen, the receiving sleeve 70 in accordance with FIG. 3b has a guide means 76, embodied as a groove, for a plug 43 of the connection line 40. Furthermore, one special characteristic of the embodiment of the receiving sleeve 70 depicted in FIG. 3b is the integral production of inner sleeve 73 and outer sleeve 74.

Figure 4:
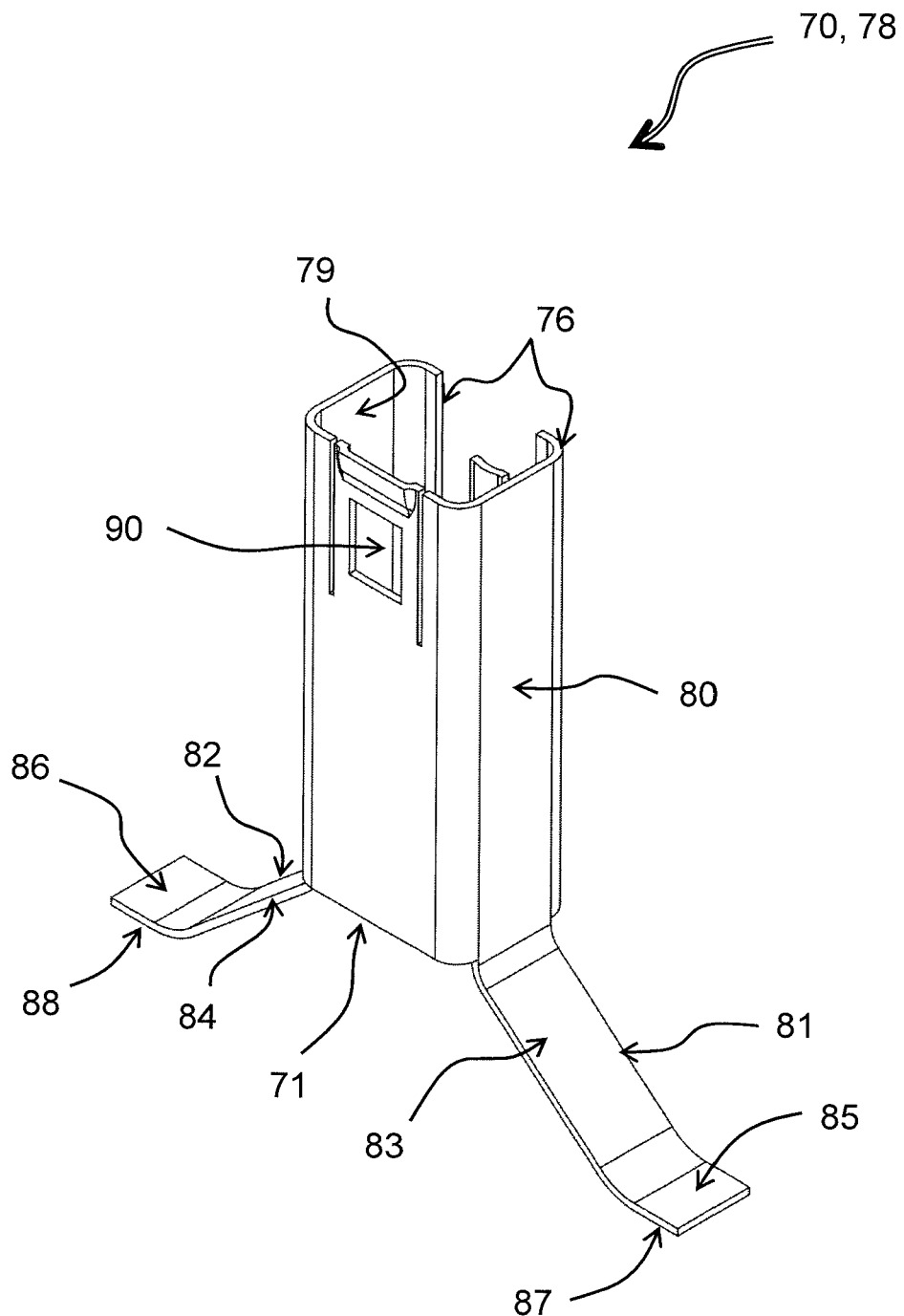
FIG. 4 is a 3D elevation of a receiving sleeve embodied as a plug housing.

FIG. 4 depicts an alternative embodiment for the receiving sleeve 70. It is embodied as a plug housing 78. This plug housing 78 also includes guide means 76. These are embodied first of all by an essentially rectangular cross-section of the receiving sleeve 70 and secondly by guide grooves.

In order to produce an electrical contact that is always reliable and detachable between the contact pins 33, 34 of the heating element 10 and the contact elements 41, 42 of the connection line 40 and between the contact pin of the ground connection 36 and that of the connection line 40, in accordance with the embodiment in FIG. 1 the connection line 40 is embodied as a three-pole plug 43. On its outer circumference it has locking elements 45 that project radially outward and that engage in the catch 90 in the receiving sleeve 70 when the plug 43 is inserted therein. So that the plug 43 cannot be inserted incorrectly, embodied on the outer circumference are two projections (not shown) that engage in the guide groves 76 of the receiving sleeve 70 like a key. The plug 43 and the connector 30 are dimensioned and designed such that after the locking elements 45 have locked in place, the contact elements 41, 42 of the connection line 40 always reliably electrically contact the contact pins 33, 34 of the heating element 10.

The hot runner nozzle 1 according to FIGS. 1 and 2 further includes a thermosensor 60. The thermosensor 60 runs parallel to the connector 30 away from the heating element 10. Initially towards the heating element 10 the thermosensor 60 is guided about the heating element 10 in a helix before it runs parallel to the support tube 12 towards the nozzle orifice 3.

For assembling the connector 30, first the ends of the terminal contacts 22, 23 of the heating element 10 are provided with contact pins 33, 34. These are then inserted into the insulation body 50, the contact pins 33, 34 locking or being clamped in its receiving channels 53. The contact pin of the ground connection 36, already preassembled in the insulation body 50, is connected using its line (not shown) to the support tube 12 of the heating element 10, preferably by soldering or mechanically. Then the base section 52 of the insulation body 50 is placed onto the heating element 10, the base section 52 covering the connection surfaces 24, 25 and terminal contacts 22, 23 of the heating element 10. The neck section 51 of the insulation body 50 is spaced apart from the surface of the heating element 10 at about a right angle and radially.

The receiving sleeve 70 is placed over the insulation element 70 so that it encloses the latter and the feet 81, 82 opposite one another face away from one another and in the longitudinal direction L of the support tube 12. By pressing the feet 81, 82 towards the heating element 10, they are elastically deformed. The feet 81, 82 are then attached to the heating element 10 by laser welding such that they are positioned against the heating element 10.

Once the receiving sleeve 70 has been fixed on the heating element 10, the material tube 2 and the heating element 10 are inserted into the housing 5 of the hot runner nozzle 1 until the end face of the flange 4 of the material tube 2 is seated on the back end 6 of the housing 5. The connector 30 projecting radially outward is inserted into the groove 7 in the housing 5.

In order to connect the heating element 10 to the current supply, it is now only necessary to couple the plug 43 or a coupling of the connection line 40 to the receiving sleeve 70. The leading contact pin for the ground connection 36 makes a contact first. The locking elements 45 lock in place so that the plug-in connection cannot be inadvertently released. The contact pins 33, 34 then contact the contact elements 41, 42 of the connection line 40. The hot runner nozzle 1 may be operated as soon as the thermosensor 60 is connected.

For releasing the electrical contact, the plug 43 or the coupling of the connection line 40 must merely be removed from the receiving sleeve 70. The locking elements 45 are retracted in that either a corresponding actuator is actuated or the plug is equipped with a so-called push-pull unit as is known for instance from the LEMO company.

The invention is not limited to any of the embodiments described in the foregoing, but rather may be modified in many ways.

One optional refinement to the described exemplary embodiments provides a buffer layer that is arranged between the insulation body 50 and the heating element 10. A temperature-resistant material, especially mica, is suitable for the buffer layer. The buffer layer then is not as hard as the insulation body 50 and the heating element 10. Furthermore, the buffer layer may be applied either as a separate component or in a material bond to the insulation body or heating element. Finally, recesses that correspond to the contact pins 33, 34, 35 or the connection surfaces 24, 25 are added to the buffer layer. The electrically conductive elements pass through these recesses.

All of the features and advantages, including unique design characteristics, spatial arrangements, and method steps that proceed from the claims, specification, and drawings may be essential to the invention both in and of themselves and in various combinations.

| Reference list | |
|---|---|
| 1 | Hot runner nozzle |
| 2 | Material tube |
| 3 | Nozzle orifice |
| 4 | Flange (material tube) |
| 5 | Housing |
| 6 | Housing end |
| 7 | Recess |
| 8 | Manifold |
| 9 | Mold insert |
| 10 | Heating element |
| 11 | Support element |
| 12 | Support tube |
| 15 | First thick film (support layer) |
| 16 | Second thick film (conductor layer) |
| 17 | Third thick film (cover layer) |
| 18 | First recess |

| Reference list | |
|---|---|
| 19 | Second recess |
| 20 | First support surface |
| 21 | Second support surface |
| 22 | First terminal contact |
| 23 | Second terminal contact |
| 24 | First connection surface |
| 25 | Second connection surface |
| 30 | Connector |
| 33 | First contact pin |
| 34 | Second contact pin |
| 35 | Additional contact pin |
| 36 | Ground connector |
| 40 | Connection line |
| 41 | First contact element |
| 42 | Second contact element |
| 43 | Plug |
| 45 | Locking element |
| 50 | Insulation body |
| 51 | Neck section |
| 52 | Base section |
| 53 | Receiving channels |
| 54 | Cavity |
| 55 | Lateral recess |
| 60 | Thermosensor |
| 70 | Receiving sleeve |
| 71 | First end of receiving sleeve |
| 73 | Inner sleeve |
| 74 | Outer sleeve |
| 75 | Collar of inner sleeve |
| 76 | Guide means |
| 77 | Coupling housing |
| 78 | Plug housing |
| 79 | Inner wall (receiving sleeve) |
| 80 | Outside |
| 81 | First foot |
| 82 | Second foot |
| 83 | First leg section |
| 84 | Second leg section |
| 85 | First support section |
| 86 | Second support section |
| 87 | First support surface |
| 88 | Second support surface |
| 90 | Catch |
| F | Prestressing force |
| L | Longitudinal direction |

The invention claimed is:

1. Hot runner nozzle (1) having an electrical heating element (10) that includes a connector (30) for producing an electrical connection to a connection line (40), terminal contacts (22, 23) for the heating element (10) terminating in an insulation body (50) for the connector (30) that separates the terminal contacts (22, 23) from one another electrically, and the connection line (40) having contact elements (41, 42) that are electrically contactable with the terminal contacts (22, 23) of the heating element (10), characterized in that the insulation body (50) is arranged at least in part in a receiving sleeve (70) of the connector (30), in that that the connection line (40) may be fixed in or on the receiving sleeve (70) such that the contact elements (41, 42) of the connection line (40) electrically contact the terminal contacts (22, 23) of the heating element (10), and in that a first end (71) of the receiving sleeve (70) that faces towards the heating element (10) wraps around the insulation body (50) and has on this first end (71) two opposing feet (81, 82) that face outward and that are attached to the heating element (10).

2. Hot runner nozzle (1) in accordance with claim 1, characterized in that the heating element (10) has a support tube (12).

3. Hot runner nozzle (1) in accordance with claim 2, characterized in that the two feet (81, 82) face in opposite directions in the longitudinal direction (L) of the support tube (12).

4. Hot runner nozzle (1) in accordance with claim 1, characterized in that the heating element (10) has a covering protective element through which the terminal contacts (22, 23) are passed and the feet (81, 82) of the receiving sleeve (70) are attached to the protective element.

5. Hot runner nozzle (1) in accordance with claim 1, characterized in that the heating element (10) has an electrically conductive thick film (15, 16, 17).

6. Hot runner nozzle (1) in accordance with claim 1, characterized in that the receiving sleeve (70) is made metal.

7. Hot runner nozzle (1) in accordance with claim 1, characterized in that the receiving sleeve (70) embodies a guide means (76) for a plug (43) or a coupling of the connection line (40).

8. Hot runner nozzle (1) in accordance with claim 1, characterized in that the feet (81, 82) are attached to the heating element in a material bond (10).

9. Hot runner nozzle (1) in accordance with claim 1, characterized in that the feet (81, 82) are embodied integral with the receiving sleeve (70).

10. Hot runner nozzle (1) in accordance with claim 1, characterized in that the feet (81, 82) are each fixed with a leg section (83, 84) on the receiving sleeve (70) and are each attached to a support section (85, 86) that is positioned against the heating element (10).

11. Hot runner nozzle (1) in accordance with claim 1, characterized in that the feet (81, 82) are attached under a prestressing force (F) on the heating element (10) and acting in the direction of the heating element (10), the receiving sleeve (70) being coupled to the insulation body (50) such that the insulation body (50) is force-actuated with this prestressing force (F) in the direction of the heating element (10).

12. Hot runner nozzle (1) in accordance with claim 1, characterized in that the insulation body (50) has a neck section (51) and a base section (52), the receiving sleeve (70) being supported on the base section (52) of the insulation body (50).

13. Hot runner nozzle (1) in accordance with claim 1, characterized in that added to a housing (5) that surrounds the heating element (10) is a lateral recess (7) that is embodied open in the longitudinal direction (L) of the hot runner nozzle (1) to a manifold (8) or to a flange (4) of a material tube (2), the receiving sleeve (70) projecting through the lateral recess (7).

14. Hot runner nozzle (1) in accordance with claim 1, characterized in that one or two additional terminal contacts are arranged in the insulation body with contact pins (35) that are electrically connected to a thermosensor (60).

15. Hot runner nozzle (1) in accordance with claim 1, characterized in that the receiving sleeve (70) has a fastening means for a thermosensor (60).

* * * * *